Figure 1:
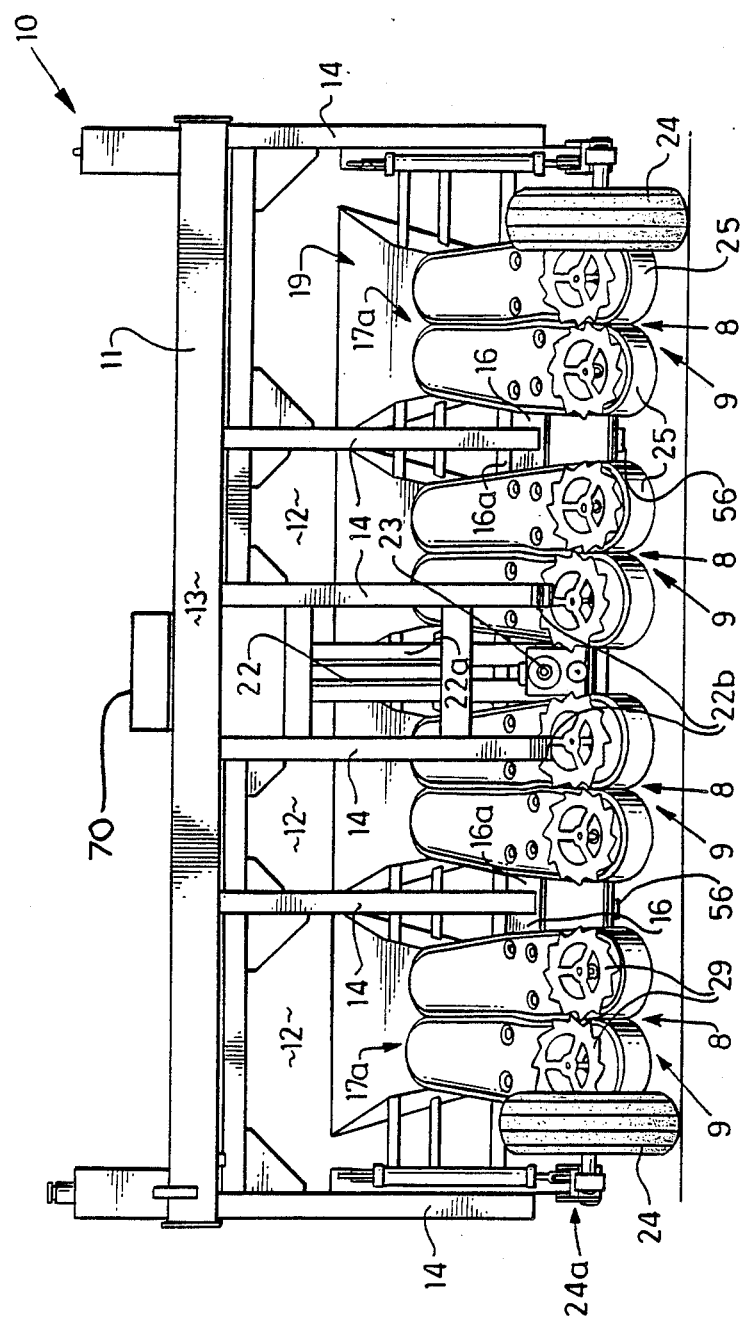

United States Patent [19]
Brown

[11] Patent Number: 4,921,050
[45] Date of Patent: May 1, 1990

[54] PLANT EXTRACTOR AND CULTIVATING APPARATUS

[76] Inventor: Wayne J. Brown, 8 David Muir Street, Slade Point, Mackay, Queensland, 4741, Australia

[21] Appl. No.: 262,328

[22] Filed: Oct. 25, 1988

[30] Foreign Application Priority Data

Oct. 26, 1987 [AU] Australia ............... PI5082

[51] Int. Cl.$^5$ ........................... A01D 25/00
[52] U.S. Cl. ........................... 171/51; 171/61; 171/6; 56/14.3; 198/628; 198/813
[58] Field of Search ............... 171/61, 10, 38, 4, 6, 171/43, 60, 51; 56/98, 119, 500, 502, 503, 504, 14.3, 14.5; 172/28, 33; 198/628, 813, 814

[56] References Cited

U.S. PATENT DOCUMENTS

| | | | |
|---|---|---|---|
| 938,881 | 11/1909 | Lee et al. ............... | 198/308.1 X |
| 1,163,729 | 12/1915 | Whitaker ............... | 171/61 |
| 1,426,767 | 8/1922 | Pettengill ............... | 171/61 |
| 1,989,152 | 1/1935 | Rassmann ............... | 171/61 X |
| 2,331,520 | 10/1943 | Urschel ............... | 171/61 X |
| 2,368,895 | 2/1945 | Spiegl ............... | 171/61 |
| 3,460,326 | 8/1969 | Holm ............... | 56/119 |
| 3,743,024 | 7/1973 | Mayo et al. ............... | 171/61 X |
| 3,940,913 | 3/1976 | Wallenfang et al. ............... | 56/14.5 X |
| 3,964,550 | 6/1976 | Storms ............... | 171/61 |
| 4,009,557 | 3/1977 | Reicks ............... | 56/14.3 X |
| 4,015,667 | 4/1977 | Ruozi ............... | 172/200 X |
| 4,173,257 | 11/1979 | Mortensen et al. ............... | 171/61 X |
| 4,185,696 | 1/1980 | Williams et al. ............... | 56/119 X |
| 4,350,207 | 9/1982 | Ben-Dor ............... | 56/14.3 X |

FOREIGN PATENT DOCUMENTS

| | | | |
|---|---|---|---|
| 0129668 | 10/1979 | Japan ............... | 198/628 |
| 0751356 | 7/1980 | U.S.S.R. ............... | 171/61 |

OTHER PUBLICATIONS

Ben-Dor "Uprooter-Shreader-Mulcher", Successful Farming article by Mike Holmberg, Jan. 1989.

Primary Examiner—Randolph A. Reese
Assistant Examiner—Jeffrey L. Thompson
Attorney, Agent, or Firm—Poms, Smith, Lande & Rose

[57] ABSTRACT

Plant extracting apparatus is provided by the present invention which utilizes spaced pairs of endless belts having adjacent runs which extend from an inlet adjacent the ground towards an elevated outlet above a cutter assembly. The adjacent runs of the belts are biassed towards one another and engage plants therebetween and pull them from the ground as they are conveyed along the adjacent runs and as the apparatus travels along. Transfer means are provided for transferring the plants to the cutter assembly.

18 Claims, 5 Drawing Sheets

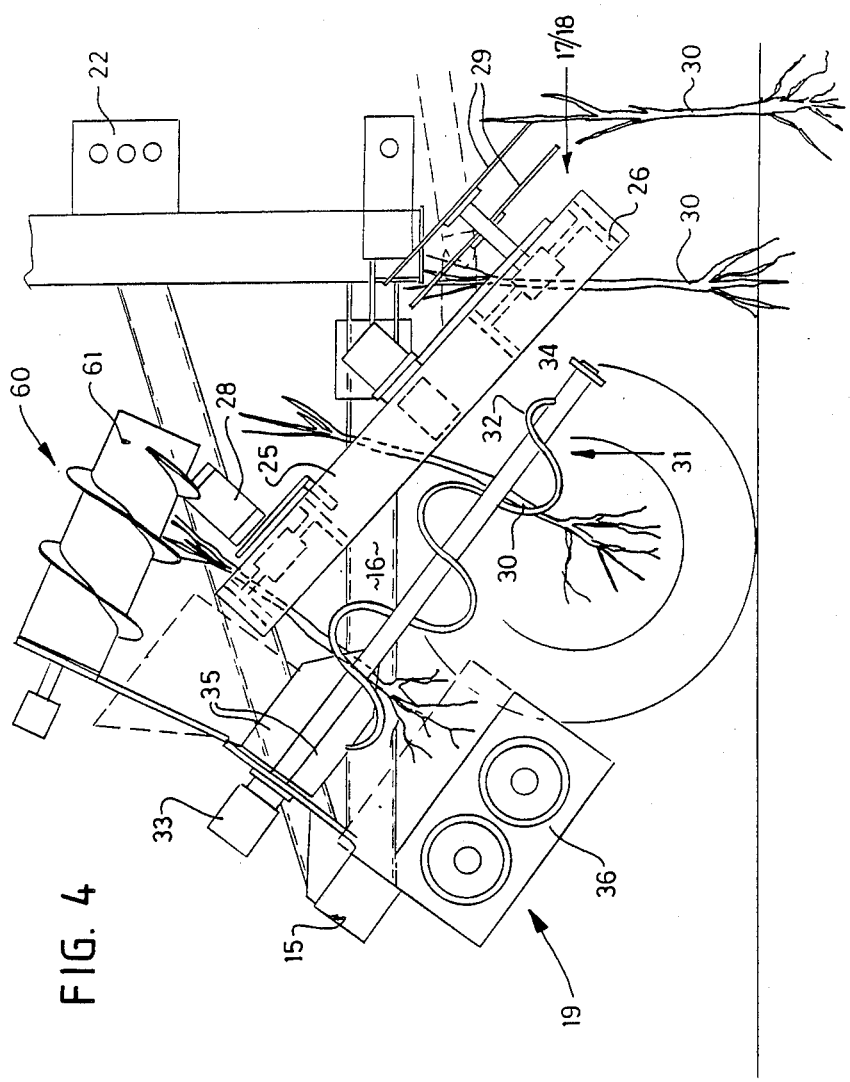

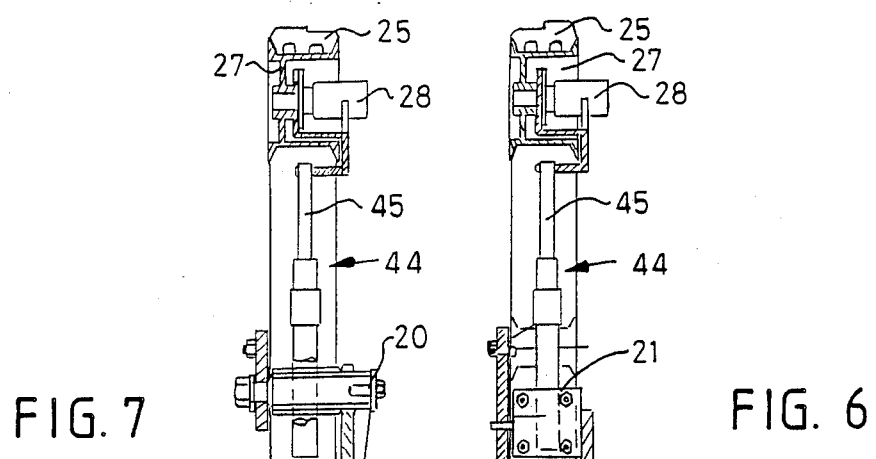
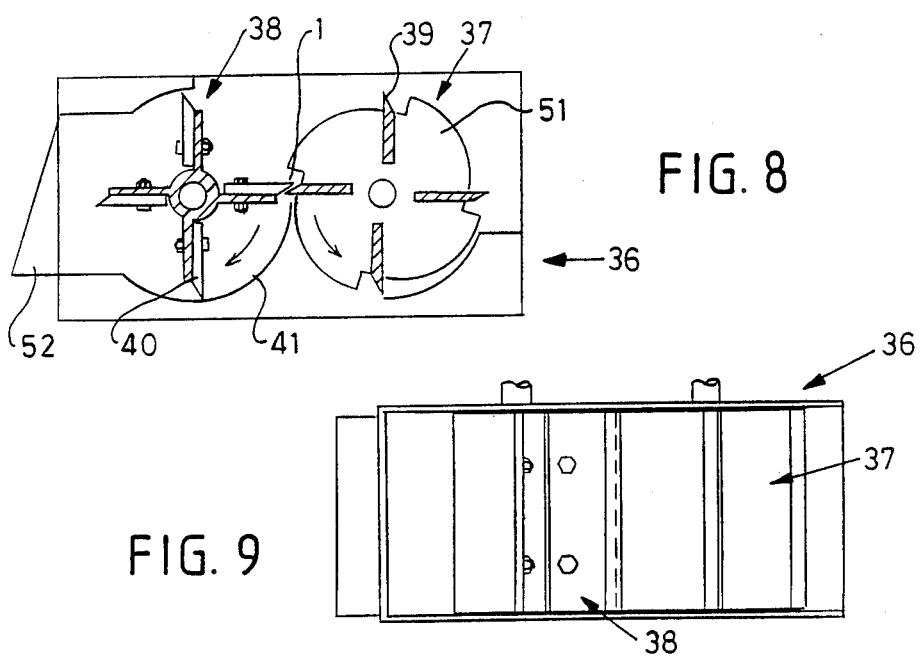

PLANT EXTRACTOR AND CULTIVATING APPARATUS

This invention relates to cultivating apparatus. This invention is particularly useful for preparation of cotton fields for planting after harvesting. Of course it can be used in other applications where it is necessary to remove harvested crops. However, for illustrative purposes reference will be made hereinafter to its application to cultivating cotton fields.

The present process for cultivating cotton fields after harvest, in preparation for planting, normally includes a first working of the fields to slash the cotton bushes, burning the slashed field leaving the existing root system intact, then ploughing to cut up the root systems. Several passes may be required to achieve an effective result. Ploughing may also incorporate several passes with deep ripping apparatus. Finally the field may be prepared for planting by reforming the beds destroyed by the previous operations.

From the above, it will be seen that a farmer requires several different implements for use at different times for specific purposes. Accordingly, because of the time involved and the capital cost of the various implements required for the separate operations, the cost of preparation of a field for planting is relatively high. Furthermore, such implements are often adapted for support by conventional three point linkages to permit accurate placement and turnaround at commencement of crop rows. For this purpose the overall length of the implements are kept as short as possible so that their C.G. is close to the tractor. This is necessary to maintain the tractor's front wheels in contact with the ground. This requirement is difficult to achieve in a machine which performs a number of specific operations.

Another difficulty which has not been satisfactorily addressed is the method of supporting a plurality of working components in a working relationship with one another and at the same time provide a machine which is accessible for service and able to operate for extended periods without chocking with soil or crop waste or a combination of same.

While attempts have been made to reduce the number of workings required to prepare a field for planting by pulling the old bushes from the field so as not to destroy the formed beds, the apparatus presently used for the purpose requires large power inputs to achieve efficient operation. Such machines are often built as trailed machines which are awkward to use.

Typically, a plant puller assembly comprises a pair of peripherally engaged wheels provided with resilient rims or tyres between which the plant stem may be clamped for pulling from the ground upon rotation of the wheels. In order to achieve effective operation the wheels are pushed together at a high contact pressure to provide a relatively long contact path along their engagement zone. This distortion of the periphery of the wheels greatly increases the power needed to rotate the wheels beyond that necessary to achieve extraction of the plant from the soil.

This invention aims to alleviate the abovementioned disadvantages and to provide cultivating apparatus which will be reliable and efficient in use. Other objects and advantages of this invention will hereinafter become apparent.

With the foregoing and other objects in view, this invention in one aspect resides broadly in cultivating apparatus including a supporting frame; support means for conveying the cultivating apparatus across a field to be cultivated; gripping means engageable about the stem of a harvested plant and operable to pull the plant from the ground; agitating means for removing dirt from the root system of the extracted harvested plant and conveying means for conveying the extracted plant to a suitable location. The conveying means may include a cutter assembly for cutting or shredding the plant.

In a preferred form the gripping means comprises a pair of endless belts supported between respective spaced pairs of opposed guide wheels and arranged with the adjacent runs of the belts biased towards an abutting relationship whereby plant stems and the like may be gripped therebetween. Preferably, the belts are formed from a resilient elastomeric material and suitably the outer face of each belt is provided with complimentary engagement features such as a complimentary transverse slip or nesting corrugations or the like for maintaining operative alignment between the belts.

In a preferred form one pair of guide wheels is fixed in relation to the supporting frame while the other pair of guide wheels is supported for movement towards and away from said fixed pair of guide wheels and biasing means are provided to bias said moveable wheels towards said fixed wheels. Preferably each moveable guide wheel is supported on a pivot arm arranged whereby belt tension biases said moveable wheels towards said fixed wheels and one said pivot arm is in the form of a ram or other extendable assembly which is adapted to maintain the desired belt tension.

It is also preferred that the agitation means comprise a pair of contra-rotatable spiral-wound members supported beneath the gripping means. The spiral wound members may be supported on a central axle which may extend rearwardly beyond the gripping means for supporting longitudinally extending fins adapted to engage the extracted plant and move the plant radially with respect to the central axle. Suitably, the fins engage the extracted plant and force it downwardly into a cutter assembly.

The supporting frame may be provided with adjustable ground wheels whereby the operative height of said gripping means may be selectively varied and if desired the supporting frame may be provided with three point linkage connections to enable the cultivating apparatus to be lifted above the ground for support by a tractor or the like.

In a further aspect, this invention resides broadly in an implement supporting frame including a pair of supporting legs extending upwardly from cultivating means to an elevated supporting beam whereby the supporting frame may straddle a row of plants to be cultivated.

Figure 2:
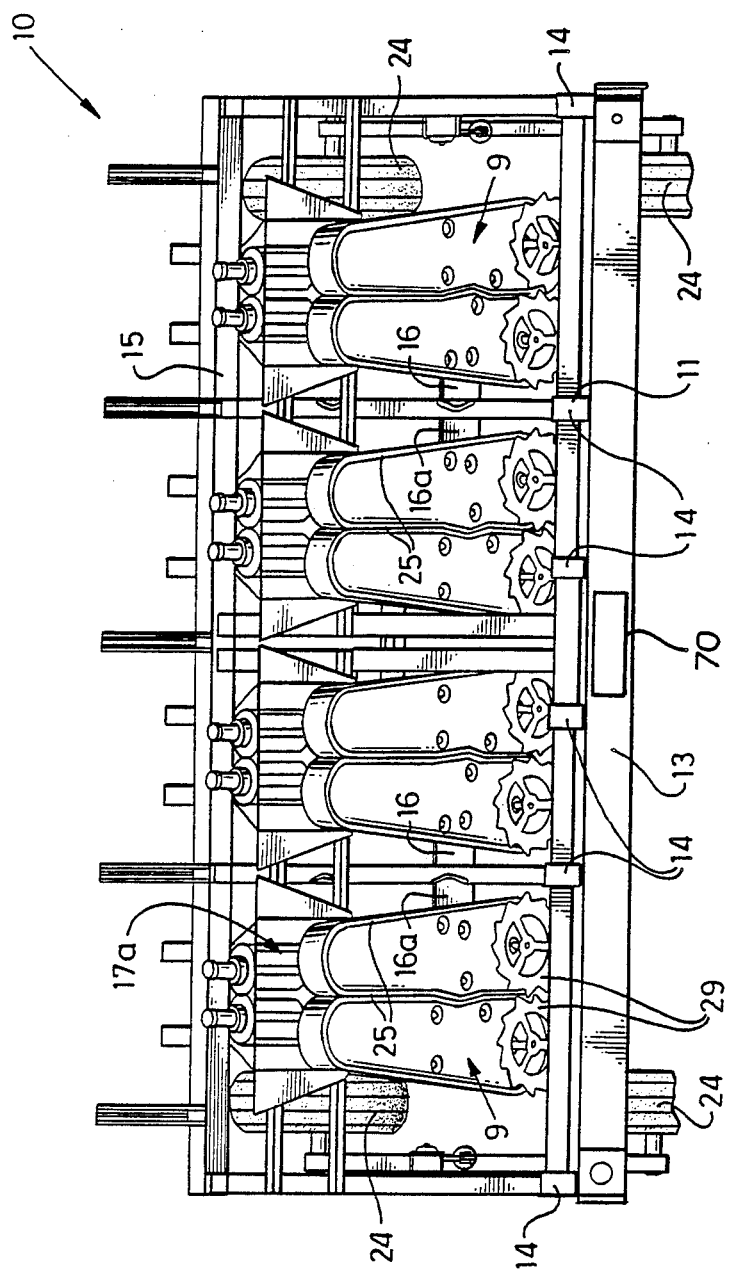
Figure 3:
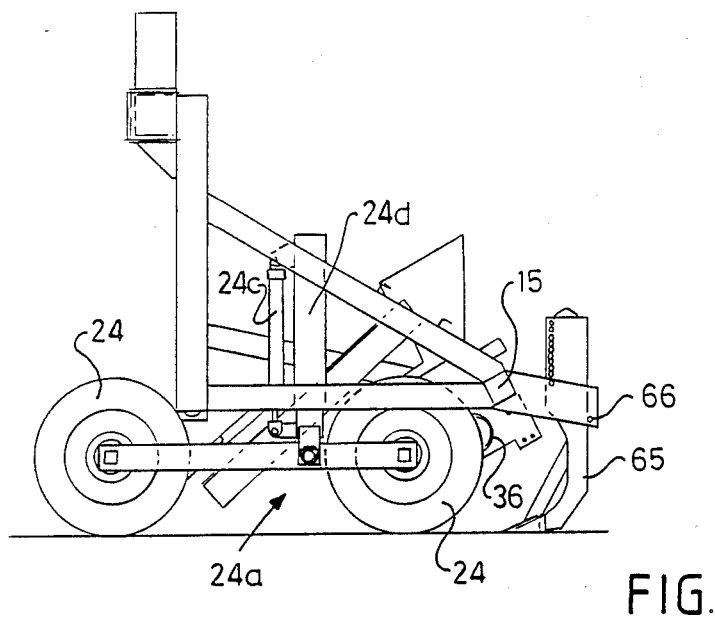
Figure 5:
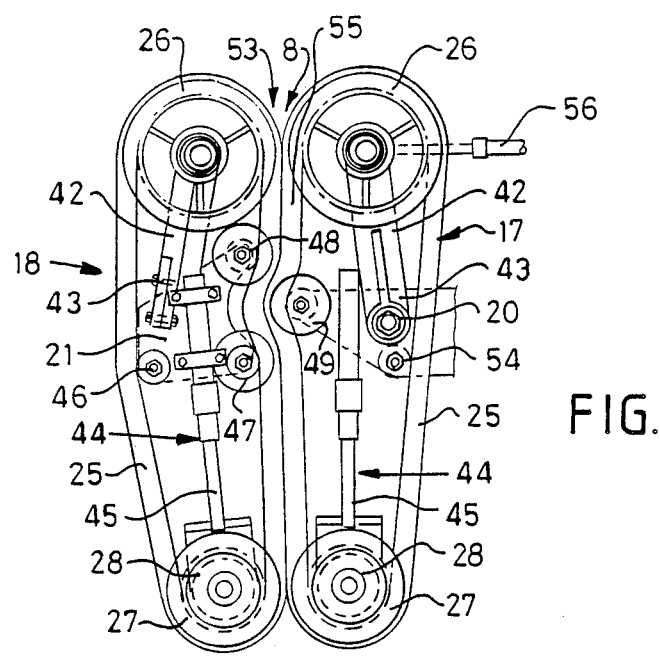

In order that this invention may be more readily understood and put into practical effect, reference will now be made to the accompanying drawings which illustrate a typical embodiment of the present invention adapted for cultivating harvested cotton fields and wherein:

FIG. 1 is a front elevational view of the cultivator;
FIG. 2 is a plan view of the cultivator;
FIG. 3 is an end view of the cultivator;
FIG. 4 is a partly broken away diagrammatic side elevational view of the cultivator illustrating its operation;
FIG. 5 is a plan view of the plant extracting assembly;

FIG. 6 and 7 are respective cross-sectional views through the complementary belt assemblies, and FIGS. 8 and 9 are plan and section views of the cutting apparatus associated with the cultivator.

As shown in FIGS. 1 to 3, the cultivator 10 includes a main frame 11 which provides four bays 12 arranged to straddle four plant beds. Respective cultivating assemblies 9 are supported in each bay 12 and each is arranged to engage with a respective row of harvested crop and remove the plants from the plant beds. The main frame 10 includes an elevated top rail or support beam 13 which is tubular and constitutes an oil reservoir for the hydraulic actuators utilized throughout the cultivator. Leg frames 14 extend downwardly and rearwardly from the top rail 13 to define the respective bays 12 therebetween.

A tool bar 15 on which further cultivating or planting implements may be supported and trailed in the respective bays is supported at the rear end of the leg frames 14. Transverse sub-frames 16 and 16a extend rearwardly from opposite sides of each leg frame and provide mountings for respective ones of each complementary pair of contra-rotating pivotable and fixed belt assemblies 17 and 18 respectively which form conveyor assemblies 17a and which co-operate to pull harvested bushes from the ground and to convey them rearwardly to a cutter assembly 19.

Each sub-frame 16 supports adjacent ones of the adjoining complementary pairs of belt assemblies 17 on pivot mountings 20 while the other sub frames 16a provide fixed mountings 21 for the remaining complementary belt assemblies 18.

The central top connection 22 of a three point linkage connection is disposed on a sub-frame 22a extending between the spaced central leg frames 14 and the lower pair of the three-point connections 22b are supported on the central leg frames 14. A power take-off connection 23 is also supported on the sub-frame 22a and is utilized to drive the hydraulic pumps and rams which constitute the various actuators on the cultivator. Adjustable height wheels 24 supported on a walking beam assembly 24a are provided to enable the cultivator 10 to be towed across a field with the belt assemblies arranged at the selected height to suit the crop being pulled. The height is adjustable by actuation of the rams 24c to extend or retract the telescopic support 24d of the walking beam assembly 24a.

Each belt assembly 17 and 18 inclines upwardly and rearwardly from its leading end and each incorporates an endless belt 25 which passes around a lower leading guide wheel 26 and upper driven guide wheel 27, which is driven by a hydraulic motor 28. Spaced sprocket-like feed wheels 29 are mounted above the lower wheels 26 for rotation therewith. The feed wheels 29 of each pair are axially spaced from each other so as to engage plants at different heights and feed same towards the inlet 8 at the lower junction of the belts 17 and 18.

A spiral conveyor assembly 31 is supported centrally beneath each pair of belt assemblies. The conveyor assembly 31 co-operates with the lower root portion of an extracted plant to convey the plant rearwardly and then downwardly, at the end of the conveying path into the cutter assembly 19. Each spiral conveyor assembly 31 comprises a pair of spiral wound bars 32 supported on a respective axle 34 and driven by a respective hydraulic motor 33. The leading end of the spiral wound bar 32 converges with the driven axle 34 while the trailing end of the bar 32 is fixed to one of a plurality of radially extending fins 35 arranged on the trailing end of the driven axle 34. The arrangement of each conveyor assembly 31 is such that the contra-rotating spiral wound bars 32 engage the lower portion of the extracted bush, which may contain a substantial amount of soil, and agitate the lower portion as it is conveyed rearwardly and upwardly to shake the soil therefrom prior to the roots being conveyed to the cutter assembly 19. At this position the stem of the bush is engaged by the leading tapered edges of the fins 35 and is driven downwardly thereby into the open mouth of the cutter box 36. As illustrated, the axle 34 extends rearwardly beyond the belt assemblies 17 and 18 so that the plant is released therefrom when engaged by the fins 35.

A further auger assembly 60 comprising a pair of laterally spaced contra-rotating augers 61 may be arranged above the co-operating belt assemblies 17 and 18 to assist in the feeding of the top portions of the conveyed plants rearwardly of the belts and into the cutter assembly 19. When used with bushy brittle plants these augers 61 will assist in preventing chocking about the upper end of the belts 17 and 18 and at the inlet to the cutter assembly.

As shown in FIGS. 8 and 9 the cutter box 36 contains a pair of contra rotating knife assemblies 37 and 38 having respective blades 39 and 40 which mesh above a lower part-cylindrical housing 41 which extends about the rear knife assembly 38. The blades 39 and 40 which rub against one another, as shown, are self sharpening and are provided with adjustment means so the appropriate overlap can be provided to enable their efficiency of operation to be maintained. The leading knife assembly 38 is provided with a stepped drum-like supporting housing 51 which guides the bushes towards the rear part-cylindrical housing 41 whereby the cut bush may be thrown from a rear chute 52 onto the ground or to a conveyor assembly as required. Suitable drive means are provided to rotate the knife assemblies 37 in unison at the appropriate speed.

As shown in FIGS. 5 to 7, each belt assembly 17 and 18 comprises a lower wheel 26 which is supported on an arm 42 which extends forwardly from a hub mounting 43 adapted for connection to the mounting 20 or 21 on the main frame 11. The body of a hydraulic ram 44 is also supported on the hub mounting 43 and the shaft 45 of the ram extends rearwardly to support the upper drive wheel 27. The aforementioned parts are common to each belt assembly 17 and 18. However, in the belt assembly 18 the arm 42 and the body of the hydraulic ram 44 are fixed against pivotal movement with respect to the mounting 21. Idler rollers 46, 47 and 48 are also provided on the fixed belt assembly 18 to maintain the desired belt configuration, especially a straight run section 55 immediately behind the converging recess 53.

The belt assembly 17 supports a central idler roller 49 on the tension run of the belts intermediate the idler roller 47 and 48 and a further roller 54 on the return run of the belt 25.

The arm 42 and the body of the hydraulic ram 44 in the belt assembly 17 are connected pivotally to the hub mounting 43 which, as illustrated, is offset to one side from the line joining the axes of the wheel 26 and 27 so that the latter are biased to the opposite side by belt tension for movement towards the adjacent fixed wheels 26 and 27. The rams 44 are interconnected to a respective or common accumulator 70 whereby they may be held at a selected pressure to induce the desired belt tension in the belts 25 and to bias the adjacent portions of the belts 25 into engagement. A further pair of rams 56 (See FIG. 1), supported on the legs 14 push the adjacent pivot arms 42 away from one another and thus provide additional engagement force along the respective run paths 55 of each complementary pair of belt assemblies 17 and 18.

Suitably, each belt is formed from a resilient polyurethane material and has a stepped cross sectional configuration as illustrated in FIG. 4. This stepped arrangement provides an enhanced grip about the stems of bushes engaged therebetween, maintains operative alignment between the belts and assists the rotational stability of the driven wheels 27. In this respect the ram shafts 45 are free to pivot about their axes so that they may pivot during working to accommodate the shape variations of plants being processed. The elastomeric belts 17 and 18 are configured for engagement with a V-belt pulley. However, as illustrated, both the guide pulleys 26 and 27 are formed as flanged flat rim pulleys. A scraper assembly 68 is provided with fingers which engage the pulleys at their belt contact points to keep those areas free of soil buildup.

This construction described above enables a belt conveyor assembly to be provided which has a simple mounting arrangement which does not unduly obstruct the passage of bushes along the conveying path and which maintains the desired tension in the belts for efficient operation.

In this embodiment, the tool bar 15 supports respective ripper tynes 65 for tilling the interspaces between plant beds. The tynes are height adjustable in known manner and may pivot to an inoperative position if an obstacle is struck by shearing a locating pin 66. The tool bar may also support hoppers, distributors and seed drills for planting the beds in the same pass as the plants are removed.

The cultivator 10 may also incorporate horizontally extending bed knives (not shown) which extend laterally into the beds from the supporting leg frames 14 in closely spaced relationship behind the inlet 8 to the belt conveyors 17a. These knives serve to disturb and loosen the beds to prepare them for planting. Furthermore their close spacing rearwardly of the conveyors 17a serves to sever the base stem of plants that can not be pulled by the belts 17 and 18.

The cultivating apparatus 10 illustrated is adapted to be connected to a three point linkage whereby it may be trailed across a harvested cotton field to pull the cotton plants and convey them to cutting apparatus at which, after removal of a substantial portion of the soil clinging to the roots thereof during passage along the conveyor assembly 19, the bushes are reduced into small particles and conveyed to a suitable receptacle or back on to the field as desired.

In use, the cultivator may be trailed behind a tractor with the ground wheels 56 adjusted to position the leading edges of the belt assemblies for engagement with the stems of plants. As the cultivator is drawn along the field the upper portions of the plants are engaged by the feed wheels 29 and directed towards the inlet 8 formed between the converging recess between the respective pairs of belt assemblies 17 and 18. The belts grip the stem portions of the bushes therebetween whereby the latter are pulled from the ground as the gripping portion of the belts moves towards the upper guide wheel 27. The elevation of the top rail 13 enables the cultivator to work effectively in tall crops.

When the plant is initially extracted from the field a substantial amount of soil will cling to the root system. This is engaged by the contra-rotating spiral wound agitating bars 32 which will shake the soil from the root system and move the lower portion of the extracted plant rearwardly at a faster rate than rearward movement of the upper portion supported between the belt assemblies 17 and 18, so that as the extracted plant approaches the end of the belt assemblies, it will be aligned substantially at right angles thereto and will be engaged by the radially extending fins 35 of each conveyor assembly which will drive the plant downwardly into the cutter assembly 19. As the plant passes into the cutter assembly it will be shredded and thrown rearwardly for deposit back onto the beds.

Suitable furrow reforming disks and or tillage apparatus may be supported on the tool bar 15 to till and reform the beds, and if desired incorporate the shredded plant back into the soil. At the end of each pass the cultivator 10 may be lifted by the three point linkage to provide good maneuverability of the implement and thus minimize wastage of cultivated fields. This is achieved by maintaining the overall length of the cultivator relatively short as illustrated.

If desired, the feed wheels may be omitted or be made detachable and if desired one may be used independently to suit plant conditions. Thus plants may be fed to the inlet by aligning the belts 17 and 18 with the plants to be pulled. Alternately the feed may elevate previously cut crops to the inlet for conveying to the cutter assembly. Furthermore, it is preferred that the rams which apply the contact pressure between the belts be fed from an adjustable accumulator so that the tensions and contact pressures may be readily adjusted to suit conditions. Of course alternate means may be used for maintaining contact pressure between the belts.

It will of course be realized that the above has been given only by way of illustrative example of the invention and that all such modifications and variations thereto as would be apparent to persons skilled in the art are deemed to fall within the broad scope and ambit of the invention as is defined in the appended claims.

I claim:

1. Plant extracting apparatus of the type having a supporting frame; support means associated with said supporting frame whereby the latter may be conveyed along a row of plants; a pair of endless belts supported by and extending between respective upper and lower guide wheels and having juxtapositioned belt runs which incline upwardly and rearwardly from a plant inlet towards an extracted plant outlet, and drive means for driving said belts whereby said juxtapositioned belt runs move upwardly and rearwardly from said plant inlet, characterized in that:

the upper and lower guide wheels supporting one of said endless belt are restrained against movement transverse to said juxtapositioned belt runs;

the upper and lower guide wheels supporting the other endless belt are supported on respective pivot arms for movement transverse to said juxtapositioned belt runs whereby induced tension in said other endless belt biases the juxtapositioned run of said other endless belt into engagement with the juxtapositioned run of said one endless belt such that plant stems may be gripped between said juxtapositioned belt runs, and one of said pivot arms is formed as a hydraulic ram which is hydraulically biassed towards an extended attitude so as to induce a desired belt tension in said other endless belt.

2. Plant extracting apparatus as claimed in claim 1, wherein one of said upper and lower guide wheels supporting said one endless belt is extendable longitudinally of said juxtapositioned belt runs and is biassed by a hydraulic ram to an extended attitude to induce a desired belt tension in said one belt.

3. Plant extracting apparatus as claimed in claim 2, wherein the hydraulic oil supply to said hydraulic rams is maintained at a substantially constant pressure using a hydraulic accumulator.

4. Plant extracting apparatus as claimed in claim 2, wherein said pivot arms are supported for pivotal movement about a common axis spaced transversely from a line interconnecting the axes of said upper and lower wheels and at the side of said line remote from said juxtapositioned belt runs.

5. Plant extraction apparatus as claimed in claim 4, including an auger assembly supported above an upper end portion of said juxtapositioned belt runs and operable to engage the upper ends of plants supported therebetween.

6. Plant extracting apparatus as claimed in claim 2, wherein said upper guide wheels are supported by hydraulic rams whereby they may pivot freely about their respective ram axes.

7. Plant extracting apparatus as claimed in claim 6, wherein each said endless belt is formed with a complementary step across its outer face.

8. Plant extracting apparatus as claimed in claim 1, wherein said juxtapositioned belt runs are displaced from a straight path between their respective upper and lower pulleys by respective intermediate guide pulleys arranged in longitudinally spaced relationship along said juxtapositioned belt runs.

9. Plant extraction apparatus as claimed in claim 8, wherein feed means are provided for directing plants to be extracted to said inlet.

10. Plant extracting apparatus as claimed in claim 1, wherein a pair of contra-rotatable spiral-wound members is supported beneath said juxtapositioned belt runs for removing dirt from the roots of plants gripped therebetween.

11. Plant extraction apparatus as claimed in claim 10, wherein said spiral-wound members extend rearwardly beyond said juxtapositioned belt runs to support longitudinally extending fins adapted to engage the extracted plant delivered to said extracted plant outlet so as to move the extracted plants into plant cutting means supported on said supporting frame.

12. Plant extraction apparatus as claimed in claim 1, wherein said supporting frame includes a pair of supporting legs extending upwardly from respective opposite sides of said juxtapositioned belt runs to an elevated supporting beam whereby the supporting frame may straddle the row of plants to be extracted.

13. Plant extracting apparatus as claimed in claim 1, wherein said belts are formed from a resilient elastomeric material.

14. Plant extracting apparatus including:
a supporting frame;
support means associated with said supporting frame whereby the latter may be conveyed along a row of plants;
a pair of endless belts supported by and extending between respective upper and lower guide wheels and having juxtapositioned belt runs which incline upwardly and rearwardly from a plant inlet towards an extracted plant outlet;
said upper guide wheels supported by fluidic rams which are fluidically biassed towards an extended attitude to induce a desired tension in said belts;
drive means for driving said belts whereby said juxtapositioned belt runs move upwardly and rearwardly from said plant inlet;
biassing means for biassing said juxtapositioned belt runs into engagement with one another, and
respective intermediate guide pulleys arranged in longitudinally spaced relationship along said juxtapositioned belt runs for displacing said juxtapositioned belt runs from a straight line path between said upper and lower guide wheels whereby the contact pressure between said juxtapositioned belt runs may be increased upwardly of said plant inlet.

15. Plant extracting apparatus as claimed in claim 14, wherein said hydraulic rams may pivot freely about their respective ram axes.

16. Plant extracting apparatus as claimed in claim 14, wherein each said endless belt is formed with a complementary step across its outer face.

17. Plant extracting apparatus including:
a supporting frame;
support means associated with said supporting frame whereby the latter may be conveyed along a row of plants;
a pair of endless belts supported by and extending between respective upper and lower guide wheels and having juxtapositioned belt runs which incline upwardly and rearwardly from a plant inlet towards an extracted plant outlet;
drive means for driving said belts whereby said juxtapositioned belt runs move upwardly and rearwardly from said plant inlet; p1 said upper and lower guide wheels supporting one said endless belt being restrained against movement transverse to said juxtapositioned belt runs;
said upper and lower guide wheels supporting the other said endless belt being supported on respective pivot arms for movement transverse to said juxtapositioned belt runs whereby induced tension in said other endless belt biases the juxtapositioned run of said other endless belt into engagement with the juxtapositioned run of said one endless belt whereby plant stems may be gripped between said juxtapositioned belt runs;
one of said pivot arms being formed as a variable length arm, and biassing means for biassing said variable length arm towards an extended attitude so as to induce a desired belt tension in said other endless belt.

18. Plant extracting apparatus as claimed in claim 17, wherein one of said upper and lower guide wheels supporting said one endless belt is extendable longitudinally of said juxtapositioned belt runs and is biassed by biassing means to an extended attitude to induce a desired belt tension in said one belt.

* * * * *